ized to open one set of gripper fingers, and pivoting the same lever in an opposite direction to open the other set of gripper fingers. Also, the moveable handle is provided with a shuttle which can be pushed from either side of the handle to simultaneously open both pairs of gripper fingers and the welding die assembly in order to remove the welded wire members after the welding operation.

United States Patent [19]
Rozmus

[11] Patent Number: 4,815,648
[45] Date of Patent: Mar. 28, 1989

[54] HAND-HELD COLD PRESSURE WELD DEVICE

[75] Inventor: Walter J. Rozmus, Port Orange, Fla.
[73] Assignee: Heintz Corporation, Philadelphia, Pa.
[21] Appl. No.: 113,621
[22] Filed: Oct. 26, 1987
[51] Int. Cl.⁴ .................. B23K 20/00; B23K 20/02
[52] U.S. Cl. ................... 228/3.1; 228/44.3; 228/115; 228/213; 140/113; 269/157
[58] Field of Search ............ 228/115, 116, 265, 212, 228/213, 243, 3.1, 44.3; 140/113; 269/157

[56] References Cited

U.S. PATENT DOCUMENTS

| | | | |
|---|---|---|---|
| 2,715,345 | 8/1955 | Rozmus | 228/3.1 |
| 2,774,262 | 12/1956 | Sowter | 228/3.1 |
| 2,829,547 | 4/1958 | Barnes | 228/3.1 |
| 2,861,487 | 11/1958 | Rozmus | 228/3.1 |
| 2,920,511 | 1/1960 | Johnson | 228/3.1 |
| 2,923,183 | 2/1960 | Johnson | 228/3.1 |
| 3,093,018 | 6/1963 | Rozmus | 228/3.1 |
| 3,106,013 | 10/1963 | Rozmus | 228/115 |
| 3,309,766 | 3/1967 | Rozmus | 228/115 |
| 3,768,718 | 10/1973 | Rozmus et al. | 140/113 |

Primary Examiner—Nicholas P. Godici
Assistant Examiner—Samuel M. Heinrich
Attorney, Agent, or Firm—MacMillan, Sobanski & Todd

[57] ABSTRACT

A hand-held welding device utilizes a multiple upset cold pressure welding technique to join abutting end surfaces of a pair of wire members. The welding device includes a pair of spaced-apart, parallel tie rods for supporting a stationary V-block in spaced apart relationship with a moveable V-block. A welding die assembly is positioned between and is actuated by the two V-blocks. An end plate is secured to one end of the tie rods adjacent the stationary V-block, while a fixed handle is adjustably secured to the opposite end. A moveable handle is pivotally mounted relative to the fixed handle and includes a working roller which engages the moveable V-block to force the V-blocks against the die assembly. As the V-blocks are forced against the die assembly, the die assembly is operated to force the ends of the wire members against one another to form a cold pressure weld. A separate pair of gripper fingers are provided on opposite sides of the die assembly for securely holding each wire member during the welding operation. The gripper fingers are mounted on a retainer assembly which is resiliently supported between the V-blocks to allow the gripper fingers to float and move axially with the die assembly during the welding operation. Each pair of gripper fingers can be selectively opened when initially loading the individual wire members by pivoting a lever in one direction to open one set of gripper fingers, and pivoting the same lever in an opposite direction to open the other set of gripper fingers. Also, the moveable handle is provided with a shuttle which can be pushed from either side of the handle to simultaneously open both pairs of gripper fingers and the welding die assembly in order to remove the welded wire members after the welding operation.

23 Claims, 4 Drawing Sheets

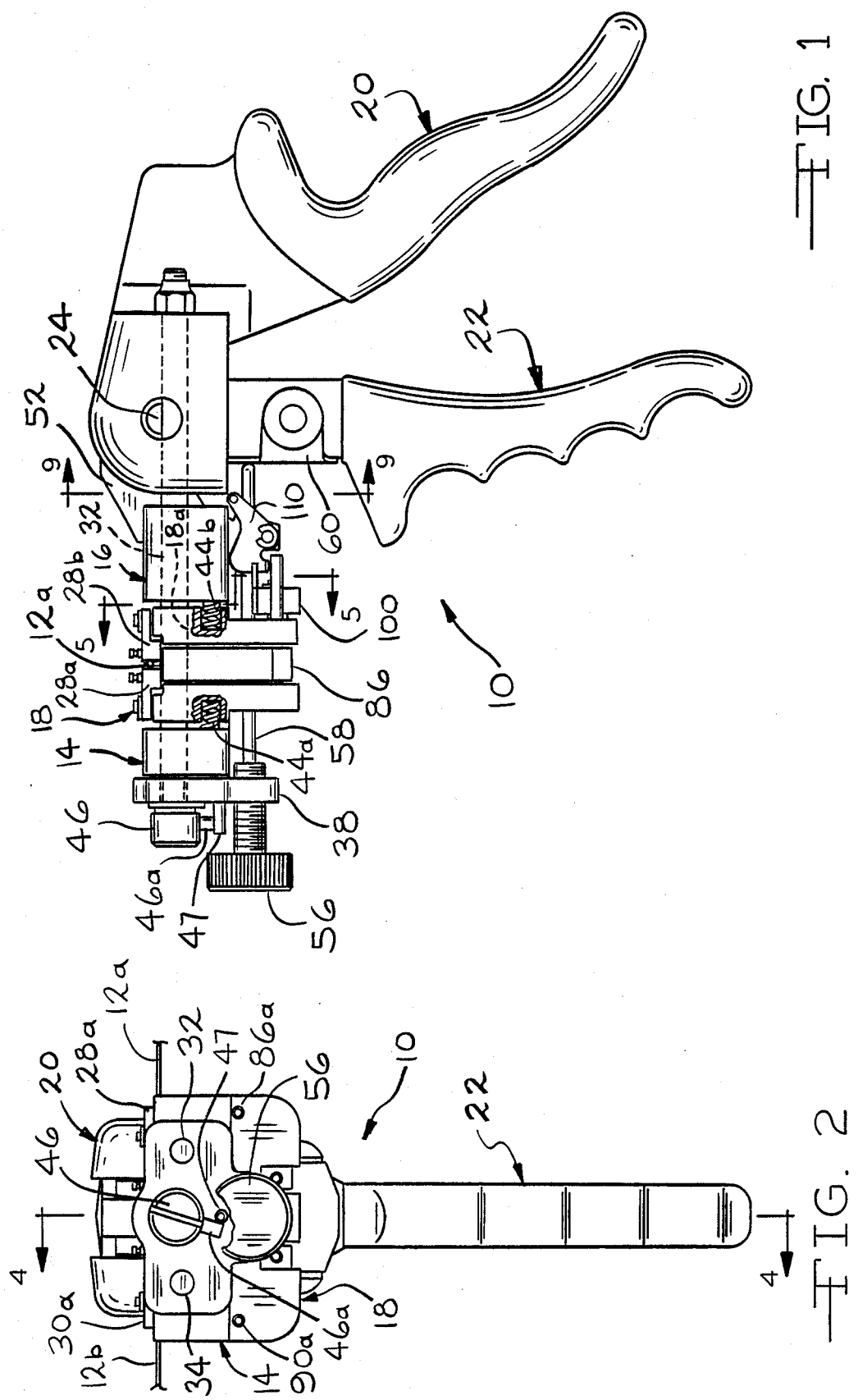

HAND-HELD COLD PRESSURE WELD DEVICE

BACKGROUND OF THE INVENTION

The present invention relates generally to a welding device for pressure welding abutting ends of a pair of workpieces constructed of a pressure weldable metal and, in particular, to a welding device which is adapted to be hand-held by the operator and can accommodate welding dies for welding wires of various sizes.

It is well known that certain metals or alloys can be welded together without heat by utilizing what is known as a cold pressure welding process. Such a welding process is particularly suited to welding together butted ends of a pair of rods, wires, strips, plates or other similar members consisting of aluminum, copper or other cold weldable metals or alloys. Basically, by applying sufficient pressure to the butted ends or surfaces of the members to be welded, the metal of both members will "flow" together and thereby securely weld the members together.

In certain instances, particularly when cold pressure welding relatively small diameter wires or narrow strips, it is desirable to utilize what is known as a "multiple upset technique". With this welding technique, a specially designed die assembly is utilized. The die assembly includes a first and second pair of dies wherein the dies of each pair are relatively moveable toward and away from the other between a released position and a wire gripping position. Further, the pairs of dies are also relatively moveable toward and away from each other between a normal open position and a welding position. The multiple upset welding technique involves a repeated upsetting process wherein the dies undergo the above relative movements through several cycles. A more detailed discussion of the multiple upset pressure welding technique can be found in U.S. Pat. Nos. 3,106,013 and 3,309,766, both issued to W. J. Rozmus.

SUMMARY OF THE INVENTION

The present invention concerns a welding device which utilizes a multiple upset cold pressure welding technique to join abutting end surfaces of a pair of wire members. The welding device of the present invention has a unique construction which enables the device to be hand-held by the operator.

More specifically, the welding device includes a pair of spaced apart, parallel tie rods for supporting a fixed V-block in spaced relationship with a moveable V-block. A welding die assembly comprised of two pair of die sections is positioned between the two V-blocks. The one ends of the tie rods are threadably secured to an end plate, while the opposite ends are secured to a fixed handle. Means are provided for adjusting the spacing between the fixed handle and the end plate.

A moveable handle is pivotally mounted relative to the fixed handle and includes a working roller which, when the handles are squeezed together, engages and moves the moveable V-block to force the V-blocks against the die assembly. As the V-blocks are forced against the die assembly, the individual die sections are operated to first move together axially relative to the tie rods to securely engage the ends of the wire members, and are then moved together transversely relative to the tie rods to force the ends of the wire members against one another to form a cold pressure weld. The above upset procedure is typically preformed several times to produce a final welded connection.

A separate pair of gripper fingers are provided on opposite sides of the die assembly for securely holding each wire member during the welding operation. In particular, after the first upset has occurred, retraction of the associated die sections tends to exert some tensile force on the wires that tends to separate the weld. The gripping fingers are provided to permit the wires (which extend transversely relative to the tie rods) to be drawn inwardly as the die sections are closed, but preclude any substantial outward or reverse movement of the wires as the die sections are retracted. In accordance with the present invention, the gripper fingers are mounted on a retainer assembly which is mounted for axial movement along the tie rods and is resiliently supported between the V-blocks. This allows the gripper fingers to float and move axially with the die assembly during the welding operation, and thus prevents any bends in the transversely extending wire members which would normally occur if the gripper fingers did not move axially with the die assembly.

The present invention includes a unique selective release actuating means which is utilized to individually open each set of gripper fingers when initially loading the individual wire members into the die assembly. More specifically, the selective release actuating means includes a lever member pivotally mounted about a pivot axis generally parallel to the tie rods. The lever member is normally maintained in a central position wherein each pair of gripper fingers are maintained in their normally closed position. The lever member is moveable in one direction from the central position to open the one pair of gripper fingers, and is moveable in an opposite direction from the central position to open the other set of gripper fingers. The lever member includes a pair of oppositely extending transverse arm portions which enable the selective release actuating means to be operated from either side of the welding device.

Further, the present invention includes a unique collective actuating mechanism which is utilized to simultaneously open both pairs of gripper fingers and the welding die assembly in order to remove the welded together wire members after the welding operation. The collective actuating means includes a shuttle mounted on the moveable handle and moveable along a predetermined path and normally biased toward a central position wherein each pair of gripper fingers remain closed. The shuttle can be pushed from either side of the handle to simultaneously open both pairs of gripper fingers.

In accordance with another feature of the present invention, the axial position of the stationary V-block along the tie rods can be adjusted relative to the end plate. Such an adjustment controls the final weld position between the moveable handle and the fixed handle, and thus enables the final weld angle between the handles to be maintained at a predetermined optimum angle at which the operator can produce the maximum welding force with a minimum of hand fatigue.

In order to reduce the effort required by the operator to produce a weld, a unique biasing means is provided for exerting a return force on the moveable handle relative to the fixed handle. In particular, the biasing means includes a compression spring carried by the fixed handle and coupled to the moveable handle by means of a linkage arm having one end pivotally supported by the fixed handle for slideable movement along the compression axis of the compression spring, and having an opposite end pivotally connected to the moveable handle. With such an arrangement, the return force on the moveable handle remains relatively constant throughout the entire range of motion of the moveable handle, and thus does not increase in direct proportion to the force produce by the compression spring.

The above, as well as other advantages of the present invention, will become readily apparent to one skilled in the art from reading the following detailed description of the invention in conjunction with the attached drawings.

BRIEF DESCRIPTION OF THE DRAWINGS

FIG. 1 is a side elevational view of a hand-held pressure weld device according to the present invention;

FIG. 2 is a front elevational view of the pressure weld device illustrated in FIG. 1;

DESCRIPTION OF THE PREFERRED EMBODIMENT

Figure 3:
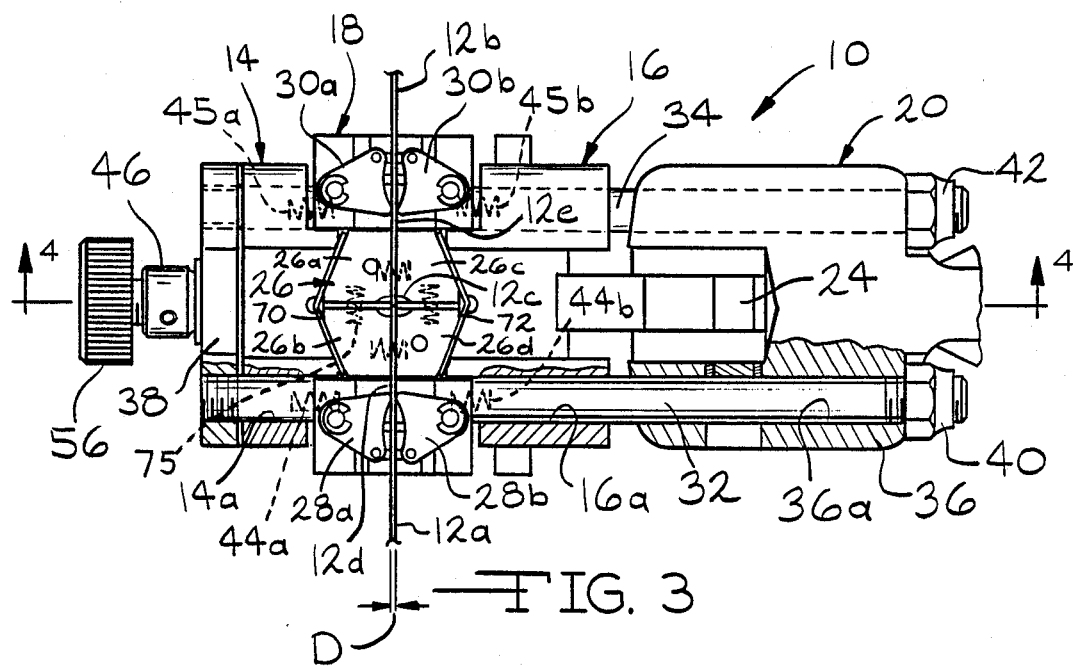
FIG. 3 is a top elevational view of the pressure weld device of FIG. 1 with the rear portion of the fixed handle broken away, and a side portion of the device shown in section to illustrate one of the tie rod members.

Referring now to the drawings, and particularly FIGS. 1 through 4, there is shown a pressure welding device 10 which is designed to be hand-held by an operator and is utilized for pressure welding abutting ends of a pair of pressure weldable metal wire members 12a and 12b. The ends of the wire members 12a and 12b are in abutting relationship at approximately point 12c shown in FIG. 3.

The general components of the welding device 10 are shown in FIG. 1 and include a stationary V-shaped die block 14, a movable V-shaped die block 16, a floating retainer assembly 18 positioned between the V-shaped die blocks 14 and 16, a fixed lever or handle 20 and a movable lever or handle 22 pivotally mounted relative to the fixed handle about a pivot pin 24. As shown in FIG. 3, a pressure welding die assembly 26 is positioned between the V-shaped die blocks 14 and 16 and is adapted to receive the end portions of the wire members 12a and 12b. Since separate die assemblies are generally used for welding wires of different diameters, it is preferred that the welding die assembly 26 be removably mounted between the die blocks.

As shown in FIG. 3, the retainer assembly 18 includes a first pair of gripper fingers 28a and 28b and a second pair of gripper fingers 30a and 30b for engaging the wire member 12a and 12b respectively during the welding operation. When in a closed position as shown in FIG. 3, the gripper fingers function to permit inward movement of the wire members toward the die assembly, but prevent outward movement of the wire members away from the die assembly. As will be discussed, the first and second sets of gripper fingers can be either selectively opened when initially loading the individual wires, or collectively opened when removing the welded wire members.

In accordance with the present invention, a unique tie rod mounting arrangement is utilized for supporting the components of the welding device 10. As shown in FIG. 3, a pair of spaced apart parallel tie rods 32 and 34 are utilized to support the die blocks 14 and 16 and the retainer assembly 18 relative to the fixed handle 20. In particular, the fixed handle 20 includes an upper body portion 36 having an aperture 36a formed therein for receiving one end of the tie rod 32. The tie rod 32 also extends through an aperture 16a formed in the die block 16, an aperture 18a (shown in FIG. 1) formed through the retainer assembly 18, and an aperture 14a formed through the stationary die block 14. The outer ends of the tie rod 32 are threaded, with the left end (as viewed in FIG. 3) threadably mounted to an end plate 38, and the right end having an adjusting nut 40 secured thereto. The other tie rod 34 extends through similar apertures formed in the fixed handle upper body portion 36, the die blocks 14 and 16, and the retainer assembly 18. Also, the tie rod 34 has one end threadably secured to the end plate 38 and has an adjusting nut 42 secured to the opposite end. After initial assembly, the adjusting nuts 40 and 42 can be utilized to establish a predetermined spacing between the fixed handle 20 and the end plate 38.

The die blocks 14 and 16 and the retainer assembly 18 are all axially slideable along the tie rods 32 and 34. As will be discussed, when the handles 20 and 22 are squeezed, the die block 16 is urged axially toward the stationary die block 14. As the die blocks 14 and 16 are moved together, the die assembly 26 is operated to force the ends of the wires 12a and 12b against one another to form a cold pressure weld at the point 12c. In accordance with the present invention, as shown in FIG. 1, the retainer assembly 18 is resiliently supported between the die blocks 14 and 16 by means of compression springs 44a and 44b located below the tie rod 32, and a pair of similar compression springs 45a and 45b (shown in FIG. 3) located below the tie rod 34. Thus, the retainer assembly 18 "floats" between the two die blocks 14 and 16. This enables each set of gripper fingers to move axially with the die assembly 26 and maintain wire members 12a and 12b substantially straight during a welding operation. If the retainer assembly did not float, bending of the wire would occur along wire portions 12d and 12e (shown in FIG. 3), which are located between the die assembly 26 and the respective gripper fingers.

Figure 4:
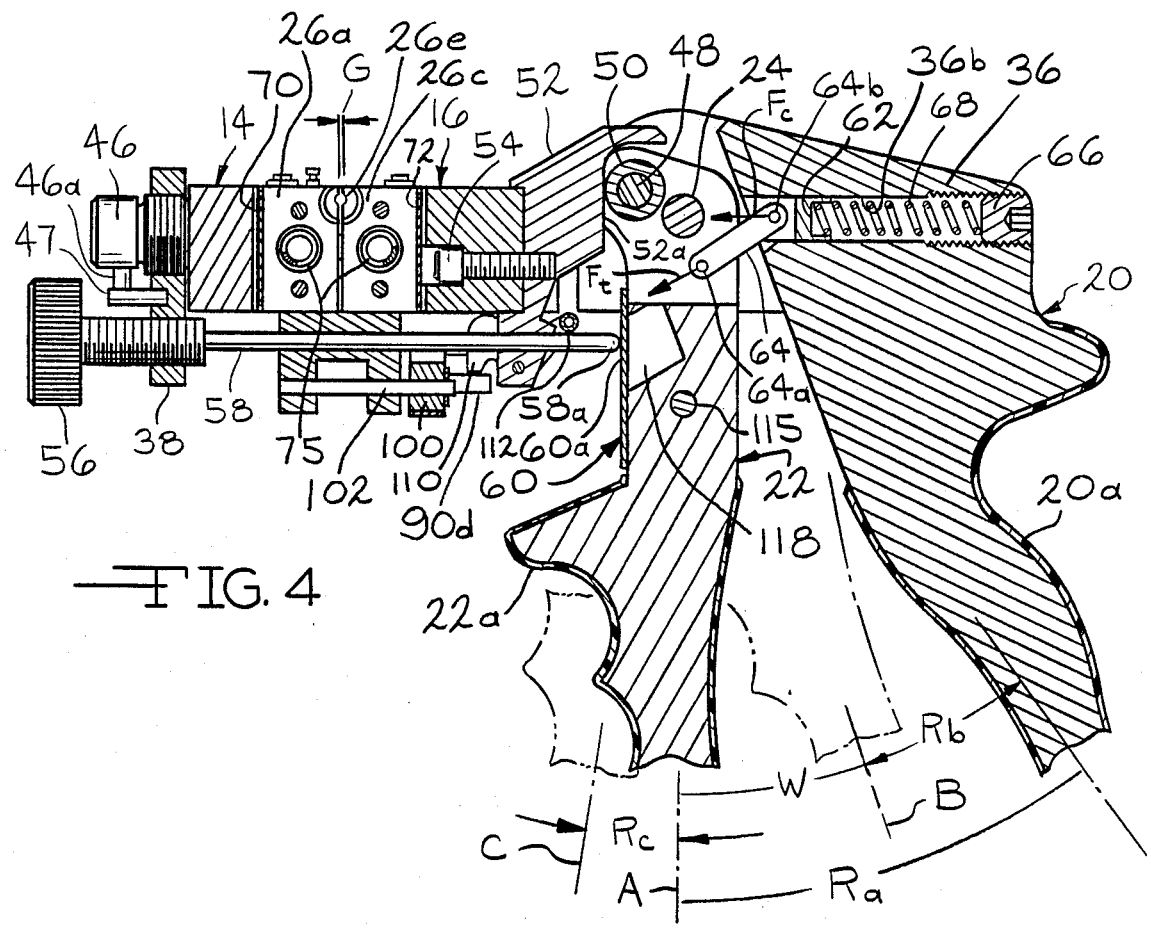
FIG. 4 is a sectional view taken along the lines 4—4 of FIGS. 2 and 3.

Referring now to FIG. 4, there is shown an adjusting screw 46 which is threadably mounted in an upper portion of the end plate 38 and is utilized to adjust the position of the stationary die block 14 relative to the end plate 38. As will be discussed, this adjustment determines the final weld position of the movable handle, and enables a predetermined optimum final handle position to be maintained when welding different size wire diameters. An axially extending stop pin 47 is mounted in the outer face of the end plate 38 and cooperates with a stop pin 46a (also shown in FIG. 2) extending radially from the head of the screw 46 to limit the rotation of the adjusting screw 46 over a range of less than 360°. By selecting the proper thread count for the threaded portion of the adjusting screw 46, the axial position of the die block 14 can be adjusted over a predetermined desired range. If desired, the outer face of the end plate 38 can be provided with indicia to indicate the desired settings for various sized wires.

As previously mentioned, the moveable handle 22 is pivotally mounted relative to the fixed handle 20 about the pivot pin 24. As shown in FIG. 4, the upper end of the moveable handle 20 is provided with a support pin 48 located above the pivot pin 24 and having a working roller 50 rotatably mounted thereon. The die block 16 is secured to an adapter 52 by means of a threaded bolt 54. The adapter 52 includes an end face 52a adapted to engage the working roller 50. As the handles 20 and 22 are squeezed together, the working roller 50 exerts an axial force on the adapter 52 which in turn urges the die block 16 along the tie rods 32 and 34 towards the die block 14. The springs 44a, 44b, 45a, and 45b, along with springs contained in the die assembly 26, normally bias the die blocks away from one another such that the adapter end face 52a is normally maintained in engagement with the working roller 50.

A second adjusting screw 56 is threadably mounted in the end plate 38 immediately below the adjusting screw 46. The adjusting screw 56 includes an axially extending stem portion 58 having an outer tip 58a which engages a stop member 60a of a release shuttle 60 mounted on the moveable handle 22. The release shuttle 60 is shown more clearly in FIGS. 9 and 10 and will be discussed in more detail hereinafter. The screw 56 is utlized to adjust the position of the die block 16 relative to the die block 14. Turning the adjusting screw 56 enables the open or extended position between the handles to be adjusted to accommodate welding dies for the different size wires. Also, the adjusting screw 56 functions as a stop to define the open position of the movable handle 22.

The movable handle 22 is normally biased to an extended position A (shown in FIG. 4) by means of a plunger and spring assembly mounted in the upper body portion 36 of the fixed handle 20. In particular, an axially extending central bore 36b is formed in the upper body portion 36 of the fixed handle 20 and has a plunger 62 slideably mounted therein. A connecting link 64 has one end pivotally connected to the upper end of the moveable handle at 64a and has an opposite end pivotally connected to the plunger at 64b. The outer end of the bore 36b is internally threaded and has an externally threaded plug 66 mounted therein. A compression spring 68 is positioned within the bore 36b between the inner ends of the plunger 62 and the plug 66. It will be appreciated that, due to the pivoting movement of the lever 64, the magnitude of the tangential force component $F_t$ acting on the movable handle 22 at the pivot point 64a will not increase at constant rate in direct proportion to the force $F_c$ of the compression spring 68. Preferably, the axial position of the bore 36b, the length of the connecting link 64, and the particular location of the pivot point 64a are selected such that, as the movable handle 22 is pivoted toward the fixed handle 20, the handle return force $F_t$ remains relatively constant throughout its entire range of motion. With this arrangement, a larger portion of the force exerted by an an operator's hand can be applied toward performing the weld, rather than overcoming the force of the handle return spring.

It should be noted that the moveable handle 22 and the fixed handle 20 are also preferrably constructed of aluminum, and can be provided with vinyl grip portions 22a and 20a, respectively.

The welding die assembly 26 is conventional and can be of the type described in U.S. Pat. No. 3,768,718, issued to W. J. Rozmus, and which is herein incorporated by reference. In particular, as shown in FIG. 3, the welding die assembly 26 includes individual sections 26a and 26c which comprise one die half and individual sections 26b and 26d which comprise the other die half. The die sections 26a and 26b cooperate to define a V-shaped surface which engages a V-shaped bearing plate 70 secured to the stationery die block 14. Similarly, the die sections 26c and 26d cooperate to define a V-shaped surface which engages a V-shaped bearing plate 72 secured to the die block 16. The bearing plate 70 is shown more clearly in the enlarged views of FIGS. 5 and 6 and is shown secured to the die block 14 by means of screw members 74. Typically, the die assembly 26 is constructed of a hardened steel while, in order to reduce the overall weight of the tool, the die blocks 14 and 16 are constructed of aluminum. It has been found desirable to construct the bearing plates 70 and 72 of a material harder than aluminum such as brass, for example, to increase the wear properties of the die blocks.

The individual die sections 26a through 26d are normally biased away from one another by means of four compression spring members 75 (shown in dashed form in FIG. 3). The die sections 26a and 26c cooperate to form an aperture 26e (shown in FIG. 4) for receiving the wire member 12b. The other two die blocks 26b and 26d cooperate to form a similar aperture for receiving the other wire member 12a. Generally, these apertures are sized such that, when the die blocks have been pressed together, each aperture will be slightly smaller than the diameter of the wire to securely grip the wire therebetween.

In FIGS. 1 through 4, the moveable handle 22 is shown in the open position A. In this position, the spacing between the die sections are set (by adjusting screw 56) to define a gap G between the planar facing surfaces of the die sections 26a and 26b and the die sections 26c and 26d. The gap G is typically set slightly smaller than the diameter D of the wire to be welded, such that the wires 12a and 12b will be retained in the respective apertures defined by the die sections.

As shown in FIG. 4, when the moveable handle 22 is in position A, an angle $R_a$ is formed with respect to the stationary handle 20. It will be appreciated that this angle $R_a$ (and thus the gap G between the die sections) can be adjusted by turning the lower adjusting screw 56 to move the stem tip 58a either toward or away from the moveable handle. During a welding stroke, as the movable handle and the fixed handle are squeezed together, the working roller 50 urges the die block 16 towards the die block 14 and thereby urges the individual die section 26a through 26d first axially toward each other to securely grip the wires, and then transversely toward the center location 12c to force the ends of the wires together.

When the operator applies a full gripping force to the handles, the handle is pivoted to a final weld position B which forms an angle $R_b$ with respect to the stationary handle 20. The angle $R_b$ can be adjusted via the top adjusting screw 46. Turning the adjusting screw 46 causes the die block 14 to move either away from or towards the end plate 38 to control the final weld position B of the handle 22. Thus, with the present invention, as different die assemblies are utilized with the welding device 10 to weld different diameter wires, the adjusting screw 46 can be adjusted for each die such that the final weld position of the moveable handle is set at a predetermined "optimum" angle $R_b$, regardless of the wire diameter. This optimum angle can be the angle at which the operator can apply the maximum force to the handles with a minimum of fatigue.

In FIG. 4, the total welding stroke is defined by the angle W, which represents the difference between the angle $R_a$ and the angle $R_b$. It has been found that a suitable weld can be obtained by utilizing what is well known as a "multiple upset technique", wherein the handles are squeezed together two or three times to form a pressure weld at the location 12c. This technique is described in more detail in U.S. Pat. Nos. 3,106,013 and 3,309,766, both issued to W. J. Rozmus, and each of which are herein incorporated by reference.

After the weld has been completed, it is necessary to open the welding dies a distance greater than the gap G to enable the welded together wire members to be removed therefrom. As will be discussed with reference to FIGS. 7 through 10, this is accomplished by operating the shuttle 60 to further extend the moveable handle 22 forwardly to a position C which, as shown in FIG. 4, forms an angle $R_c$ relative to the normal open position A. When in this position, the spacing between the die sections will be greater than the diameter of the wire, allowing the wire to be removed therefrom.

Figure 6:
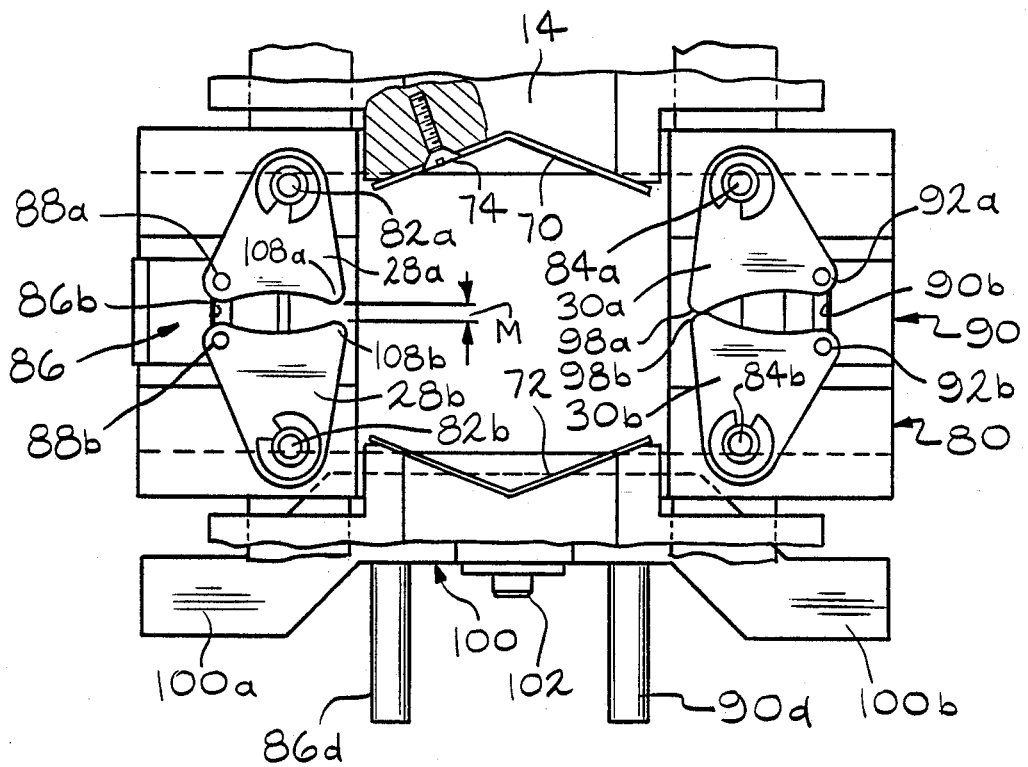
FIG. 6 is a top view of the retainer assembly taken along the line 6—6 in FIG. 5.
Figure 5:
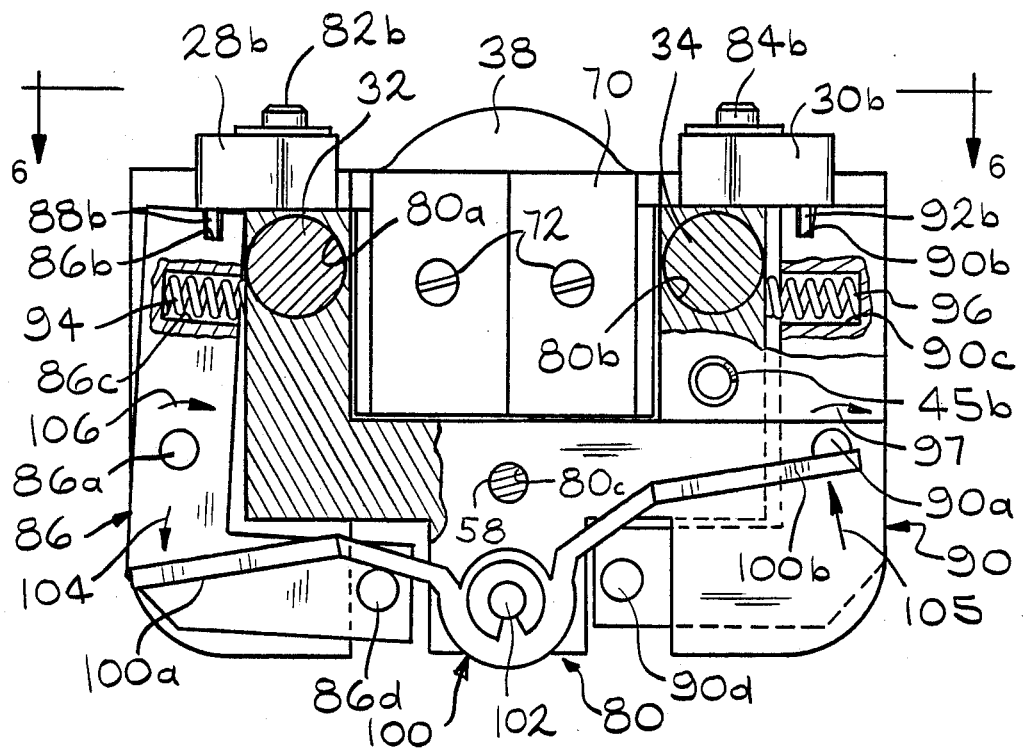
FIG. 5 is a sectional view taken substantially along the line 5—5 of FIG. 1, and illustrating a retainer assembly which includes a lever mechanism utilized to selectively open each set of gripper fingers.
Figure 7:
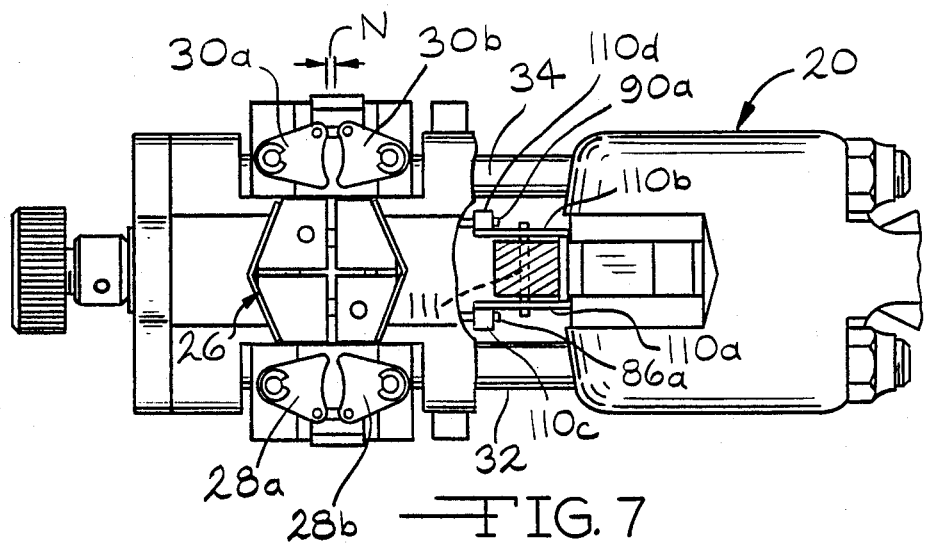
FIG. 7 is a top elevational view similar to FIG. 3, but showing the gripper fingers and the die assembly in an open, spaced apart position.
Figure 8:
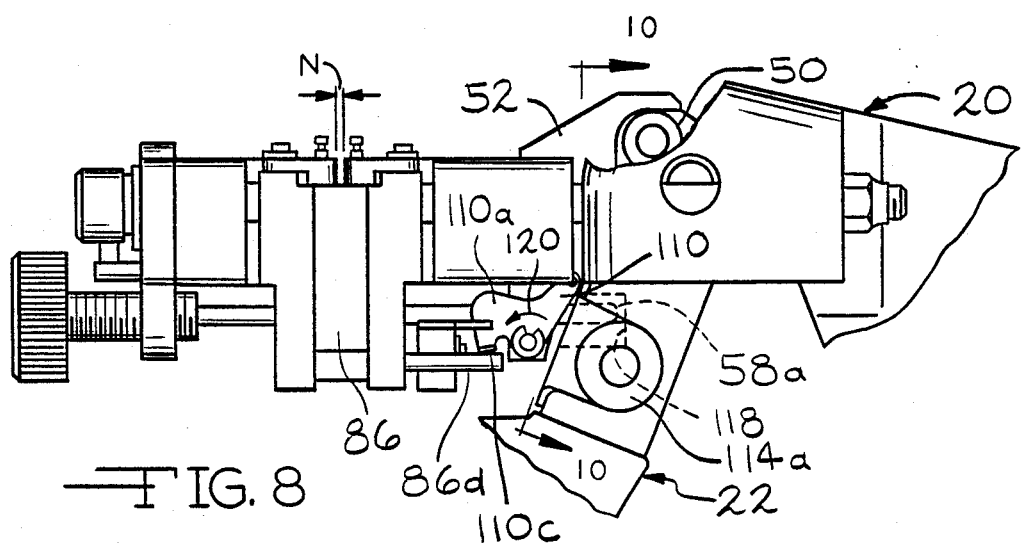
FIG. 8 is a side elevational view taken along the line 8—8 of FIG. 7 and illustrating the forwardly extended position of the movable handle which causes both pair of gripper fingers and the die assembly to open simultaneously.

Referring now to FIGS. 5 and 6, the specific manner in which the gripper fingers are individually opened to allow the respective wire portions to be inserted therethrough will now be discussed. The retainer assembly 18 includes a main body 80 having apertures 80a and 80b formed therein for slideably receiving tie rod members 32 and 34 respectively. It should be noted that the aperture 80a corresponds to the aperture 18a shown in FIG. 1. The main body 80 also includes an aperture 80c for receiving the stem portion 58 of the adjusting screw 56.

The gripper fingers 28a and 28b are pivotally attached to an upper portion of the main body 80 at pivot locations 82a and 82b, respectively. Similarly, the gripper fingers 30a and 30b are pivotally attached to an upper portion of the main body 80 at pivot locations 84a and 84b, respectively. A separate rocker arm is pivotally mounted on each side of the main body 80 and is utilized to individually actuate the respective gripper fingers. For example, in FIG. 5, an L-shaped rocker arm 86 is pivotally mounted about a pivot pin 86a. The upper end of the rocker arm 86 is provided with an elongated slot 86b formed parallel with the tie rod members for receiving pin members 88a and 88b extending downwardly from the gripper fingers 28a and 28b respectively. Similarly, a second L-shaped rocker arm 90 is pivotally mounted to the main body 80 at 90a and is provided with an upper elongated slot 90b for receiving pin members 92a and 92b extending downwardly from the gripper fingers 30a and 30b respectively. Compression springs 94 and 96 are located within cavities 86c and 90c formed in the respective rocker arm 86 and 90 and engage opposite side faces of the main body 80 to normally bias the upper ends of the rocker arms away from the main body. For example, the spring 96 causes the rocker arm 90 to pivot in a direction indicated by the arrow 97. This in turn causes the downwardly projecting pin members 92a and 92b to be urged away from one another in the slot 90b, thus pivoting the fingers 30a and 30b in a direction which biases the gripping portions 98a and 98b of the fingers 30a and 30b toward and against one another.

A lever means 100 includes projecting arm members 100a and 100b and is pivotally mounted about a pivot pin 102 secured to the main body 80. The rocker arms 86 and 90 are each provided with horizontally projecting pin members 86d and 90d which extend from the lower ends of the rocker arms and under the lever arm members 100a and 100b respectively. When either the lever arm 100a is moved downwardly in a direction indicated by the arrow 104, or the opposite lever arm 100b is moved upwardly in a direction indication by the arrow 105, the lower surface of the arm 100a will engage the horizontal pin member 86b and cause the rocker arm 86 to pivot about the pivot point 86a in a direction indicated by the direction arrow 106. This causes the spring 94 to compress, while also moving the elongated slot 86b inwardly toward the main body 80. As the slot 86b is moved inwardly, the downwardly projecting pins 88a and 88b of the gripper fingers 28a and 28b respectively, will be urged towards one another. This causes the gripper fingers to pivot in a direction which moves the gripping portions 108a and 108b of the fingers 28a and 28b away from one another by a distance M, which is selected to be at least as great as the maximum diameter of the wire to be welded.

By pivoting the lever 100 in a direction opposite that indicated by the direction arrows 104 and 105, the lever arm 100b will move downwardly and engage the actuating pin 90d and cause the rocker arm 90 to pivot and open the gripper fingers 30a and 30b in a similar manner. It will be appreciated that the lever 100 is accessible to and can be actuated by the operator from either side of the tool, and that only a single lever is needed to selectively actuate each pair of gripper fingers.

As previously mentioned, once the ends of the wire members have been welded together, it is necessary to open the welding dies and the associated gripper fingers in order to enable the joined wire members to be lifted from the welding dies. The welding device of the present invention incorporates a unique collective finger release mechanism which can be actuated from either side of the tool. Referring now to FIGS. 7 through 10, the release mechanism includes an operating lever 110 pivotally mounted to the lower end of the adapter 52 about a pivot pin 111. The operating lever 110 includes a pair of spaced apart parallel plate portions 110a and 110b located on opposite sides of the adapter 52 and having transverse tabs 110c and 110d formed at the forward end thereof which extend immediately over the rocker arm actuating pins 86d and 90d, respectively. The rear end of the plate members 110a and 110b are connected by a spacer pin 112.

Referring back to FIG. 4, normally the spacer pin 112 rests along the top of the stem 58 such that the tabs 110c and 110d are immediately above the actuating pins 86d and 90d. Also, as shown in FIG. 4, the outer tip 58a of the stem 58 engages the upwardly extending stop portion 60a of the release shuttle 60. This limits the pivotal movement of the moveable handle 22 to the position A which is shown in FIG. 4.

Figures 9, 10:
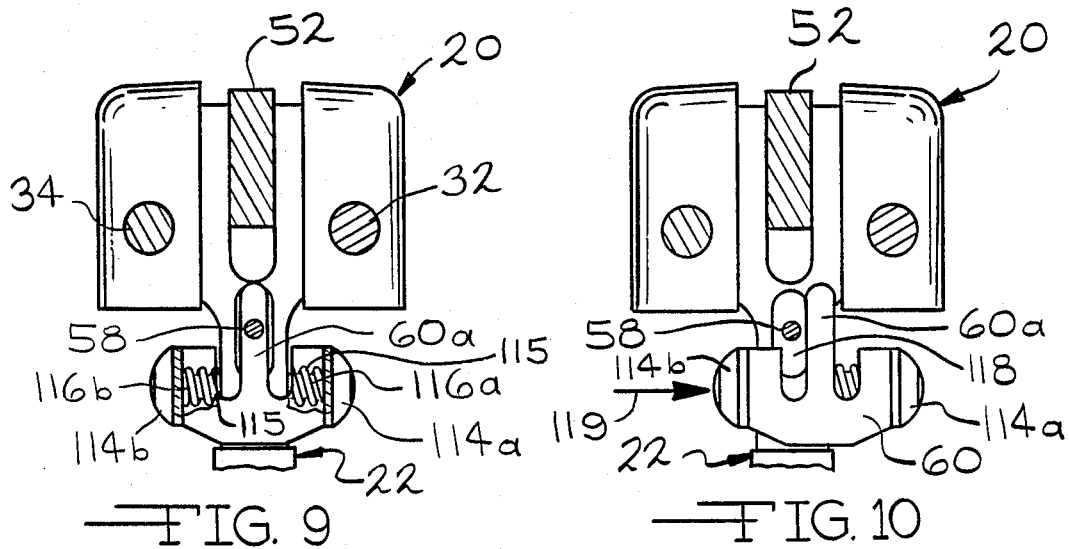
FIG. 9 is a sectional view taken along the line 9—9 of FIG. 1 and illustrating the position of a release shuttle on the movable handle in its unactuated position.
FIG. 10 is a sectional view similar to FIG. 9, but taken along the line 10—10 of FIG. 8, and showing the release shuttle moved to an actuated position to enable further forward movement of the moveable handle which causes the gripper fingers and the die assembly to open as shown in FIG. 7.

The release shuttle 60 includes a pair of release buttons 114a and 114b located on opposite sides of the moveable handle and connected by means of a pin member 115 extending through and slideable within the moveable handle. Also, a pair of coil spring members 116a and 116b are located on opposite sides of the handle and cooperate to maintain the release shuttle in a normally centered position as shown in FIG. 9. This prevents the stem end 58a from entering a cavity 118 formed in the moveable handle 22. When it is desired to open the die assembly and the gripping fingers, the release shuttle 60 is pushed transversely in a direction such as in the direction indicated in FIG. 10 by the arrow 119, thus opening the cavity 118 and allowing the moveable handle 22 to be pivoted further from the fixed handle 20 to the position C, shown in FIG. 4, which forms angle $R_c$ with respect to the position A. As the moveable handle 22 is pivoted, the upper end of the lever 110 is engaged by the handle 22 and is pivoted in a direction indicated by the direction arrow 120 of FIG. 8. This causes the actuating tabs 110c and 110d to depress the actuating pins 86d and 90d of the rocker arm and simultaneously open each set of gripper fingers. At the same time, the working roller 50 mounted to the upper end of the moveable arm 22 moves rearwardly to allow the die assembly to open. It will be appreciated that the release actuating member can be actuated from either side of the tool, by depressing either of the release buttons 114a or 114b.

It will be appreciated that the features of the present invention can be practiced otherwise than as specifically illustrated and described herein. For example, in some instances, it may be desirable to construct a hand-held weld device which does not include all of the above discussed features. Also, while the present invention has been specifically described as a hand-held and operated welder, it will be appreciated that many of the above concepts can be applied to a bench mounted weld device, or a weld device wherein a separate power means such as a fluid actuated cylinder is utilized to pivot the levers or handles 20 and 22.

What is claimed is:

1. A welding device for cold pressure welding abutting surfaces of first and second workpieces comprising:
   a longitudinally extending tie rod means having an axis;
   first and second block members mounted in spaced relationship on said tie rod means for axial movement relative to one another along said tie rod means;
   die means positioned between said block members for receiving the first and second workpieces and for producing a pressure weld at abutting surfaces of the workpieces when a predetermined force is applied to said die means by said block members;
   means for securing said first block member adjacent one end of said tie rod means;
   a first lever axially spaced from said first block member and secured to an opposite end of said tie rod means;
   said second block member mounted for axial movement on said tie rod means between said first block member and said first lever; and
   a second lever pivotally mounted relative to said first lever, said second lever provided with means engageable with said second block member when said second lever is pivoted in one direction toward said first lever for axially moving said second block member toward said first block member while engaging said die means therebetween and applying said predetermined force to said die means to produce said pressure weld.

2. The welding device according to claim 1 wherein said workpieces extend outwardly from said die means in a direction generally transverse to said axis and further including workpiece gripping means positioned adjacent said die means for engaging a portion of at least one of the first and second workpieces and securing the engaged workpiece relative to said die means, and means for mounting said workpiece gripping means on said tie rod means for axial movement along said axis to enable the axial position of the engaged portion of the workpiece to move axially with said die means during the time said pressure weld is produced.

3. The welding device according to claim 2 wherein said means for mounting said workpiece gripping means includes a retainer block axially slideable on said tie rod means between said first and second block members, and spring means for resiliently positioning said retainer block between said first and second block members.

4. The welding device according to claim 1 wherein said means for securing said first block member includes means for adjusting the axial position of said first block member along said axis.

5. The welding device according to claim 1 and further including: first and second gripping means carried by said tie rod means for engaging and securing respective ones of the first and second workpieces relative to said die means during a welding operation; each of said first and second gripping means movable between a normally closed position wherein a workpiece positioned therein is secured thereto to an open position wherein said workpiece positioned therein can be removed therefrom; and selective release actuating means carried by said tie rod means and coupled to individually open said first and second gripping means, said actuating means including a lever member normally maintained in a central position wherein said first and second gripping means are closed, said lever member moveable in one direction from said central position to open said first gripping means and moveable in an opposite direction from said central position to open said second gripping means.

6. The welding device according to claim 5 wherein said lever member is pivotally mounted about a pivot axis generally parallel to said tie rod means axis, said lever member including a pair of arms extending transversely to said pivot axis in opposite directions from one another.

7. The welding device according to claim 1 and further including: first and second gripping means carried by said tie rod means for engaging and securing respective ones of the first and second workpieces relative to said die means during a welding operation; each of said first and second gripping means movable between a normally closed position wherein a workpiece positioned therein is secured thereto to an open position wherein said workpiece positioned therein can be removed therefrom; and collective release actuating means carried by said tie rod means and coupled to simultaneously open said first and second gripping means, said actuating means including a shuttle member moveable along a predetermined path and normally biased toward a central position wherein said first and second gripping means are closed, said shuttle member moveable in one direction along said path from said central position to a first actuated position to simultaneously open said first and second gripping means, said shuttle member moveable in an opposite direction along said path from said central position to a second actuated position to simultaneously open said first and second gripping means.

8. The welding device according to claim 1 and including: biasing means for exerting a return force on said second lever for normally urging said second lever in a direction opposite said one direction, said biasing means including a compression spring carried by said first lever and coupled to said second lever by a linkage arm having one end pivotally supported by said first lever for slideable movement along a compression axis of said spring means and having an opposite end pivotally connected to said second lever.

9. The welding device according to claim 1 wherein said tie rod means includes a pair of spaced apart parallel tie rod members.

10. The welding device according to claim 1 including means for adjusting the axial position of said first lever along said tie rod means.

11. The welding device according to claim 1 including an end plate secured to said one end of said tie rod means.

12. The welding device according to claim 11 including means for adjusting the axial position of said first block member along said axis, said means for adjusting includes an adjusting screw threaded into said end plate and having an end portion engageable with said first block member for changing the axial position of said first block member as said screw is rotated.

13. The welding device according to claim 11 including means for biasing said second lever in an opposite direction away from said first lever and against a stop means supported by said tie rod means.

14. The welding device according to claim 13 wherein said stop means is adjustable and includes an adjusting screw threaded into said end plate and having an end portion engageable with said second lever.

15. The welding device according to claim 1 including a separate bearing plate interposed between said first block member and said die means and between said second block member and said die means.

16. A welding device for cold pressure welding abutting surfaces of first and second workpieces comprising:
a support means having an axis;
die means carried by said support means for receiving the first and second workpieces and for producing a pressure weld at abutting surfaces of the workpieces when a predetermined force is applied to said die means, said workpieces extending outwardly from said die means in a direction generally transverse to said axis;
means for moving said die means along said axis while applying said predetermined force to said die means to produce said pressure weld;
workpiece gripping means positioned adjacent said die means for engaging a portion of at least one of the first and second workpieces and securing the engaged workpiece relative to said die means; and
means for mounting said workpiece gripping means on said support means for axial movement along said axis to enable the axial position of the engaged portion of the workpiece to move axially with said die means during the time said pressure weld is produced.

17. The welding device according to claim 16 wherein said means for mounting said workpiece gripping means includes a retainer block axially slideable on said support means between first and second block members, and spring means for resiliently positioning said retainer block between said first and second block members.

18. A welding device for cold pressure welding abutting ends of first and second workpieces comprising:
a support means having an axis;
first and second block members mounted in spaced relationship on said support means for axial movement relative to one another along said axis;
die means positioned between said block members for receiving the first and second workpieces and for producing a pressure weld at abutting surfaces of the workpieces when a predetermined force is applied to said die means by said block members;
means for adjustably securing said first block member at a selected position along said axis and
means for moving said second block member toward said first block member while engaging said die means therebetween and applying said predetermined force to said die means to produce said pressure weld.

19. The welding device according to claim 18 wherein said adjusting means includes an adjusting screw threadably mounted relative to said support means and having an end portion engageable with said first block member for selecting the axial position of said first block member along said axis as said screw is rotated.

20. A welding device for cold pressure welding abutting surfaces of first and second workpieces comprising:
support means;
die means carried by said support means for receiving the first and second workpieces and for producing a pressure weld at abutting surfaces of the workpieces when a predetermined force is applied to said die means;
first and second gripping means carried by said support means for engaging and securing respective ones of the first and second workpieces relative to said die means during a welding operation;
each of said first and second gripping means movable between a normally closed position wherein a workpiece positioned therein is secured thereto to an open position wherein said workpiece positioned therein can be removed therefrom; and
selective release actuating means carried by said support means and coupled to individually open said first and second gripping means, said actuating means including a lever member normally maintained in a central position wherein said first and second gripping means are closed, said lever member movable in one direction from said central position to open said first gripping means and moveable in an opposite direction from said central position to open said second gripping means.

21. The welding device according to claim 20 wherein said lever member is pivotally mounted about a pivot axis generally parallel to said support means axis, said lever member including a pair of arms extending transversely to said pivot axis in opposite directions from one another.

22. A welding device for cold pressure welding abutting surfaces of first and second workpieces comprising:
   support means;
   die means carried by said support means for receiving the first and second workpieces and for producing a pressure weld at abutting surfaces of said workpieces when a predetermined force is applied to said die means;
   first and second gripping means carried by said support means for engaging and securing respective ones of the first and second workpieces relative to said die means during a welding operation;
   each of said first and second gripping means movable between a normally closed position wherein a workpiece positioned therein is secured thereto to an open position wherein said workpiece positioned therein can be removed therefrom; and
   collective release actuating means carried by said support means and coupled to simultaneously open said first and second gripping means, said actuating means including a shuttle member moveable along a predetermined path and normally biased toward a central position wherein said first and second gripping means are closed, said shuttle member moveable in one direction along said path from said central position to a first actuated position to simultaneously open said first and second gripping means, said shuttle member moveable in an opposite direction along said path from said central position to a second actuated position to simultaneously open said first and second gripping means.

23. A welding device for cold pressure welding abutting surfaces of first and second workpieces comprising:
   support means;
   die means carried by said support means for receiving the first and second workpieces and for producing a pressure weld at abutting surfaces of the workpieces when a predetermined force is applied to said die means;
   lever means pivotally mounted relative to said support means and coupled to apply said predetermined force to said die members when said lever means is pivoted a predetermined amount in one direction; and
   biasing means for exerting a return force on said lever means for normally urging said lever means in a direction opposite said one direction, said biasing means including a compression spring carried by said support means and coupled to said lever means by a linkage arm having one end pivotally supported by said support means for slideable movement along a compression axis of said spring means and having an opposite end pivotally connected to said lever means.

* * * * *